United States Patent [19]

Agranat et al.

[11] Patent Number: 5,008,833

[45] Date of Patent: Apr. 16, 1991

[54] PARALLEL OPTOELECTRONIC NEURAL NETWORK PROCESSORS

[75] Inventors: Aharon J. Agranat; Charles F. Neugebauer, both of Pasadena; Amnon Yariv, San Marino, all of Calif.

[73] Assignee: California Institute of Technology, Pasadena, Calif.

[21] Appl. No.: 495,781

[22] Filed: Mar. 19, 1990

Related U.S. Application Data

[63] Continuation-in-part of Ser. No. 273,099, Nov. 18, 1988, abandoned, which is a continuation-in-part of Ser. No. 34,593, Apr. 6, 1987, abandoned.

[51] Int. Cl.⁵ .............................................. G06F 15/18
[52] U.S. Cl. .................................... 364/513; 364/807
[58] Field of Search ............... 364/807, 800, 801, 802, 364/513, 602, 200 MS File, 900 MS File, 822; 307/201; 382/14, 15; 250/211, 201.9; 357/24; 365/183, 215, 234

[56] References Cited

U.S. PATENT DOCUMENTS

| | | | |
|---|---|---|---|
| 4,254,474 | 3/1981 | Cooper et al. | 364/900 |
| 4,326,259 | 4/1982 | Cooper et al. | 364/900 X |
| 4,518,866 | 5/1985 | Clymer | 307/201 |
| 4,591,980 | 5/1986 | Huberman et al. | 364/200 |
| 4,660,166 | 4/1987 | Hopfield | 364/807 |
| 4,719,591 | 1/1988 | Hopfield et al. | 364/807 |
| 4,773,024 | 9/1988 | Faggin et al. | 364/900 |

Primary Examiner—Joseph Ruggiero
Attorney, Agent, or Firm—Antonio M. Fernandez

[57] ABSTRACT

Several embodiments of neural processors implemented on a VLSI circuit chip are disclosed, all of which are capable of entering a matrix T into an array of photosensitive devices which may be charge coupled or charge injection devices (CCD or CID). Using CCD's to receive and store the synapses of the matrix T from a spatial light modulator, or other optical means of projecting an array of pixels, semiparallel synchronous operation is achieved. Using CID's, full parallel synchronous operation is achieved. And using phototransistors to receive the array of pixels, full parallel and asynchronous operation is achieved. In the latter case, the source of the pixel matrix must provide the memory necessary for the matrix T. In the other cases, the source of the pixel matrix may be turned off after the matrix T has been entered and stored by the CCD's or CID's.

10 Claims, 9 Drawing Sheets

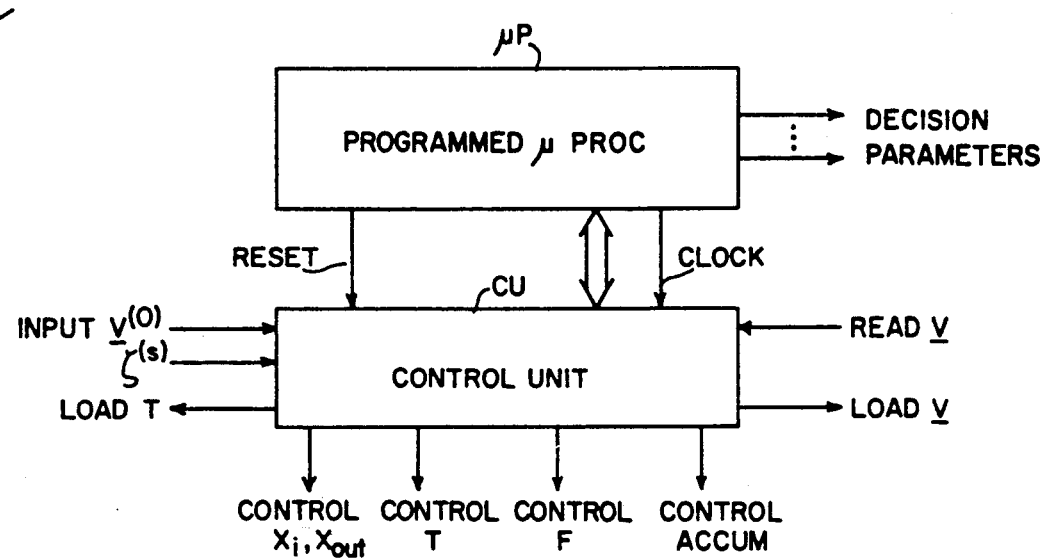
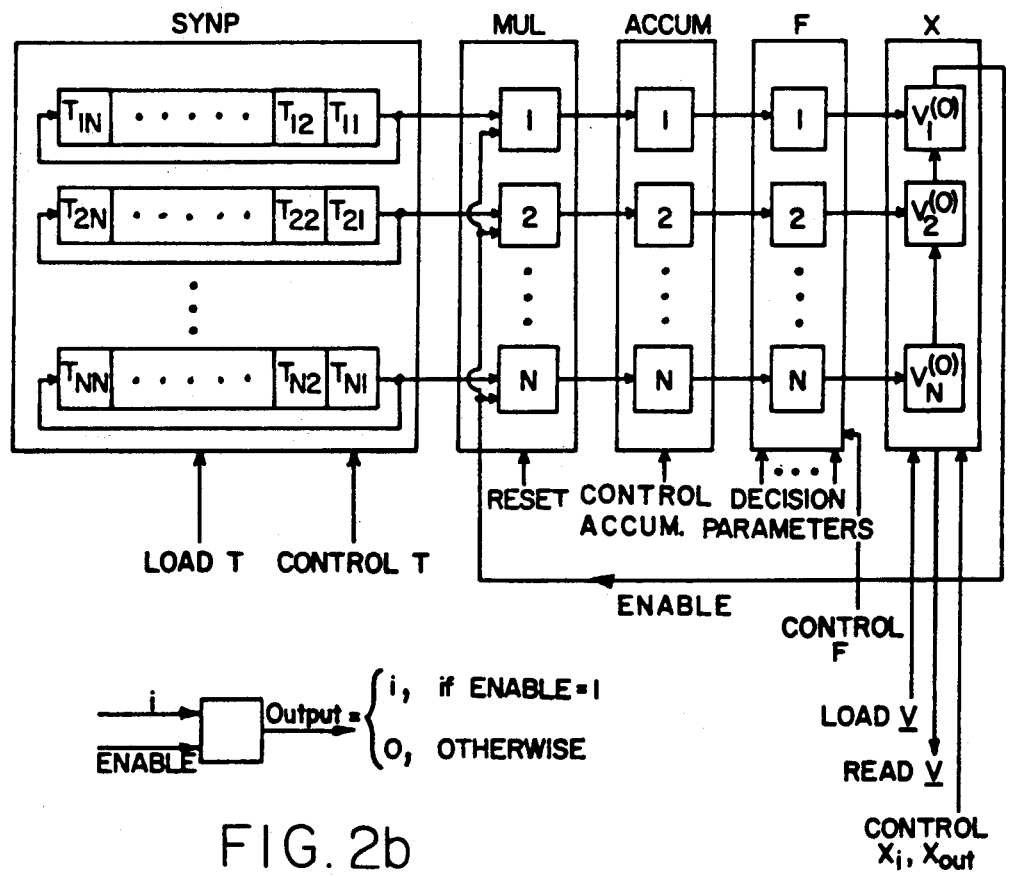
FIG. 2a
FIG. 2b

TABLE OF ONE CYCLE OF OPERATION

| | RESET ↓ | 1st CLOCK ↓ | 2nd CLOCK ↓ | (N−1)th CLOCK ↓ | Nth CLOCK ↓ | (N+1)th CLOCK ↓ | (N+2)TH CLOCK ↓ | RESET ↓ |
|---|---|---|---|---|---|---|---|---|
| LEFT COLUMN OF "SYNP" (INPUT OF G) | | $T_{11}$ $T_{21}$ ⋮ | $T_{12}$ $T_{22}$ ⋮ | | $T_{1N}$ $T_{2N}$ ⋮ | $T_{1N}$ ⋮ | $T_{1N}$ ⋮ | $T_{1N}$ ⋮ |
| ENABLE PORT OF "G" | | $v_1^{(0)}$ | $v_2^{(0)}$ | | $v_N^{(0)}$ | | | |
| "ACCUM" (OUTPUT OF "G") | 0 | $T_{11}v_1$ $T_{21}v_1$ ⋮ $T_{N1}v_1$ | | $\sum_{i=1}^{N-1} T_{11}v_i^{(0)}$ ⋮ $\sum_{i=1}^{N-1} T_{N1}v_i^{(0)}$ | $\sum_{i=1}^{N} T_{11}v_i^{(0)}$ ⋮ $\sum_{i=1}^{N} T_{N1}v_i^{(0)}$ | | | 0 |
| OUTPUT OF "F" | | INACTIVE | INACTIVE | | INACTIVE | INACTIVE | $v_1^{(1)}$ ⋮ $v_N^{(1)}$ | |
| "X" | | $v_1^{(0)}$ ⋮ $v_N^{(0)}$ | $v_2^{(0)}$ ⋮ $v_N^{(0)}$ | | $v_N^{(0)}$ ⋮ | | | $v_1^{(1)}$ ⋮ $v_N^{(1)}$ |

FIG. 4

PARALLEL OPTOELECTRONIC NEURAL NETWORK PROCESSORS

BACKGROUND OF THE INVENTION

This application is a continuation-in-part of application Ser. No. 07/273,099 filed Nov. 18, 1988 abandoned, which is a continuation-in-part of application Ser. No. 07/034,593 filed Apr. 6, 1987 abandoned.

This invention relates to neural network (NN) models based on combining electronic signal processing on silicon wafers with spatial light modulators which act as parallel memories, and more particularly to new architectures for realizing neural network processors using optics where micro-electronics fails to provide optimum performance, namely using optics to provide interconnectivity between a neural processor and a learning processor with memory implemented either with electronic or optical processing techniques, or a hybrid of both electronic and optical technologies.

NN models, which evolved from efforts to understand neurophysiological and psychological phenomena, are now being considered for performing various artificial intelligence tasks. However, further advance in this field is limited due to the absence of reliable and efficient hardware realizations of NN models.

A typical NN model consists of many simple processing units called the neurons, each connected to many or all the others. The state of the network is the collective state of the neurons, and the data stored in it is distributed as the strength of the connections between the neurons called synapses. Consequently, realizing NN models using electronics poses severe problems:

(a) The synapses require a very complex wiring scheme virtually impossible to achieve with integrated circuit techniques.
(b) "Teaching" the network to modify the synapses is a slow process in an electronic system which must be addressed serially through its regular I/O ports.

Neural network theories describe the behavior of a state vector $\underline{V}$ as a result of the synaptic interaction between its components. A given set of vectors $\underline{V}^{(s)}$, $s=1, \ldots p$, is stored in the system by setting its synaptic interaction matrix T according to this set. This is done by using some learning rule: cf. L. Personnaz, I. Guyon and G. Drayfus, J. Phys. Lett. (Paris), page 359 (1985). After the state of the system is set to an initial vector $\underline{V}^{(o)}$, it is expected that the system will stabilize at one of the stored vectors $\underline{V}^{(s)}$ most similar to the initial state vector $\underline{V}^{(o)}$. This operation is referred to as associative recall because, with only a few correct "clues" in the initial vector $\underline{V}^{(o)}$, the final state is vector $\underline{V}^{(f)}$ one of the set of vectors $\underline{V}^{(s)}$ stored in the synapses of the matrix which most closely matches the initial vector $\underline{V}^{(o)}$.

In order to understand the basic principles of the invention, it is important to better understand the basic dynamics of neural networks in greater detail. The neurons can be binary: e.g., $V_i \epsilon \{0,1\}$, or they can be analog: e.g., $V_i \epsilon [-a,a]$ where "a" is some real number. As just noted above, the neurons are interconnected by synapses, the strength of which is given by the synaptic interaction matrix T, where $T_{ij}$ designates the strength of the connection from the j'th neuron to the i'th neuron. Each neuron is updated according to the total current that flows into it, namely $I_i$ for the i'th neuron where $$I_i = \sum_j T_{ij} V_j. \tag{1}$$

By using some decision process, such as designated by the equation $$V_i = \phi(I_i, b_i) \tag{2}$$

where $b_i$ is a constant parameter of the i'th neuron, the next state V of the i'th neuron is determined.

The decision process by which the new state of the neuron is assigned can be either deterministic, see Hopfield, Proc. Natl. Acad. Sci., U.S.A. 79, 2554 (1982), or stochastic (W. A. Little, Math. Biosci. 19, 101 (1974). For example, in the original Hopfield model, the decision process for a binary network is deterministic and is simply a threshold function which is given for the i'th neuron by $$V_i = \begin{cases} 1 \text{ if } I_i \geq U \\ 0 \text{ if } I_i < U \end{cases} \tag{3}$$

where $V_i$ is the new value assigned to the i'th neuron, $I_i$ is the input current, and U is a predetermined threshold value.

A deterministic decision process for an analog network is more complex. It is given for the i'th neuron by some dependence of V on $I_i$, e.g., $$V_i = \frac{1}{e^{-\beta_i(I_i - u_i)} + 1} \tag{4}$$

where $V_i$ is the next state of the i'th neuron, and $\beta_i$ and $u_i$ are constant parameter sets of the i'th neuron.

A stochastic decision function for a binary network involves the probability that the i'th neuron will become active ($V_i \rightarrow 1$) given by $$P_i(V_i = 1) = \frac{1}{e^{-\beta_i(I_i - u_i)} + 1}. \tag{5}$$

$V_i$ is assigned using the following threshold procedure:
(1) Compute $P_i(V_i = 1)$.
(2) Produce a random number between 0 to 1.
(3) If $p_i(V=1)$ is smaller than the random number $\rightarrow V = 0$, otherwise $\rightarrow V_i \sim 1$.

One possible application of NN models is as content addressable (associative) memories. In that application, a set of p N-dimensional vectors, $\underline{V}^{(s)}$ $s=1 \ldots p$, are stored in the network by modifying the synapses using some "learning rule." For example, the learning rule used by Hopfield to store $\underline{V}^{(s)}$, $s=1 \ldots p$, N-dimensional vectors in a binary N-dimensional network is $$T_{ij} = \sum_{s=1}^{p} (2V_i^{(s)} - 1)(2V_j^{(s)} - 1). \tag{6}$$

It was shown by Hopfield that each of the stored vectors $\underline{V}^{(s)}$ will be a stable state of the network. Moreover, it is expected that if the system is not in one of the stable states ($\underline{V}^{(o)} \neq \underline{V}^{(s)}$, $s=1 \ldots p$), it will be attracted to the stable state which is the closest to its initial state. The $T_{ij}$'s are not necessarily computed in advance and loaded into the network prior to its operation. One of the interesting features of NN models is the ability to perform independent learning. Here the $T_{ij}$'s are modified according to the reaction of the network to some teaching pattern, as done for example when the "error back propagation" learning method is applied.

The NN models can be updated either synchronously or asynchronously. In the synchronous case, the NN model is updated in cycles. For each cycle, the state of each neuron is set according to the state of the NN model in the previous cycle. In the asynchronous case, each neuron is updated according to the state of the NN model at the updating moment. As will become apparent, these options can be implemented with similar ease using the basic architecture of the present invention.

SUMMARY OF THE INVENTION

In accordance with the present invention, a two-dimensional spatial light modulator (SLM), including its memory and control units, stores a synaptic interaction matrix T in the form of a distribution of light intensities, i.e., in the form of light intensity emitted from each pixel $P_{ij}$ of an array of pixels proportional to $T_{ij}$ of the interaction matrix. By imaging the interaction matrix from the SLM, which serves as the memory unit, onto an array of detectors of a neural processor (NP), the matrix T can be loaded in parallel into the NP, which includes a neural network (NN) fabricated in an integrated circuit. The NP updates the output vector state $\underline{V}$ of the neural network by computing the neuronic current $I_i$ in parallel and then performing a decision process.

The NP may be realized in several different ways. A first way is to provide an array of N linear CCD shift registers, each having N stages, thus forming an $N \times N$ matrix of charge storage cells (pixels) into which the respective rows of the matrix T are entered in parallel by the SLM. The NP is then operated synchronously. At successive sync clock periods, the columns of the array are sequentially multiplied by the respective neuron state $V_i$ of an initial state vector $\underline{V}^{(0)}$ stored in a register X, and the results are accumulated in a column of integrators. After all of the columns of the matrix T have been multiplied by each of the respective neuron states $V_i$ of the initial state vector $\underline{V}^{(0)}$ in the register X, a decision function is used to operate on the outputs of the column of accumulators to determine the next neuron states $V_j$, after which the initial state vector $\underline{V}^{(0)}$ in the register X is updated, according to the neuron states thus computed. The procedure is repeated until the state vector $\underline{V}$ at the output of the register X becomes stable. Thus, the neuronic currents $I_i$ are calculated in a semiparallel synchronous manner.

A second way of implementing the NP is to realize the $N \times N$ array of pixels with a charge injection device (CID). Initially, the synaptic interaction matrix T is imaged onto the CID pixels and each pixel accumulates a charge proportional to the respective $T_{ij}$, where i is a row number 1, 2 ... N and j is a column number 1, 2 . .. N. After thus loading the matrix T in parallel from the SLM, synchronous operation of the NP takes place. During a single sync clock period, a charge transfer takes place and for each column, if the respective neuron of a row is active, the charge transfer into a row conductor f that pixel is enabled, i.e., for the j'th column, if $V_j = 1$, then $T_{ij}$ is transferred to the i'th row.

The charge transferred to each CID row during the single clock period is sensed collectively, thus the charge measured at each row is proportional to $I_i$. The state of the vector stored in an register X for an initial state vector $\underline{V}^{(0)}$ is then updated using a decision function for each row, i.e., for each i'th position of the state vector in the register X. At the end of a single cycle, the register X contains a vector corresponding to one stored in the matrix T which is similar to the initial vector entered into the register X, but not necessarily the most similar. The system is then reset either nondestructively for another cycle of operation. The charge in each CID pixel is thus returned to the charge collecting electrode of the charge injective device (CID), and the system is ready for another cycle. The update cycle can thus be repeated until the state vector $\underline{V}$ of the register X converges, which may occur in one or more cycles, each time bringing the state vector $\underline{V}$ in the register X closer to one of the vectors stored in the CID matrix. The CID array may also be destructively reset in order to enter a new matrix T. In a destructive reset, the charges in the CID array are dumped, and the CID array is ready for optical reloading as before for an entirely new set of vectors in the matrix T.

A third way of implementing the NP is to provide an $N \times N$ array of photodetectors to receive a matrix T from a spatial light modulator utilizing a phototransistor in series with a FET gate for each photodetector. Each phototransistor generates a current proportional to $T_{ij}$, and its FET gate passes the current generated to a row conductor i in response to a signal $V_j$ from the state vector $\underline{V}$ only when it is equal to binary 1, thus forming the sum of products $$\sum_j T_{ij} V_j.$$

Otherwise the organization and operation is the same as for the second way of implementing the NP except that the multiplication $T_{ij}V_j$ and the updating of the state vector $\underline{V}$ is continuous. The control unit of the NP continues to sample the state vector to determine when a stable state has been reached. Then, as in other embodiments, a new state vector may be entered, or the matrix T may be updated, depending on how the NP is being used, as in an associative memory or in some other way.

BRIEF DESCRIPTION OF THE DRAWINGS

FIG. 2a is a schematic diagram of a first embodiment of a neural processor in FIG. 1 comprising N rows of N dimensional CCD registers for implementing a synaptic interconnection matrix SYNP self-connected (recirculating) in the rows for storing a matrix T loaded prior to the operation of the system, a column of N multipliers MUL with a common multiplier input to each, a column of N registers ACCUM, a column F of N decision functions, e.g., threshold functions F, and an N dimensional register (X) with the initial state vector $\underline{V}^{(o)}$ as loaded prior to the operation of the invention.

FIG. 2b is a diagram which explains the function of gates 1 through N of the column of multipliers MUL for the case of a single-bit binary multiplier (0, 1), each of which is an AND gate that transmits the signal $T_{ij}$, where i = 1 ... N and j = is the column number 1 ... N, when the multiplier signal, ENABLE, from the register X is not zero.

FIG. 4 is a table referred to in the text in describing the operation of the system in FIG. 2a.

DESCRIPTION OF THE PREFERRED EMBODIMENTS

Figure 1:
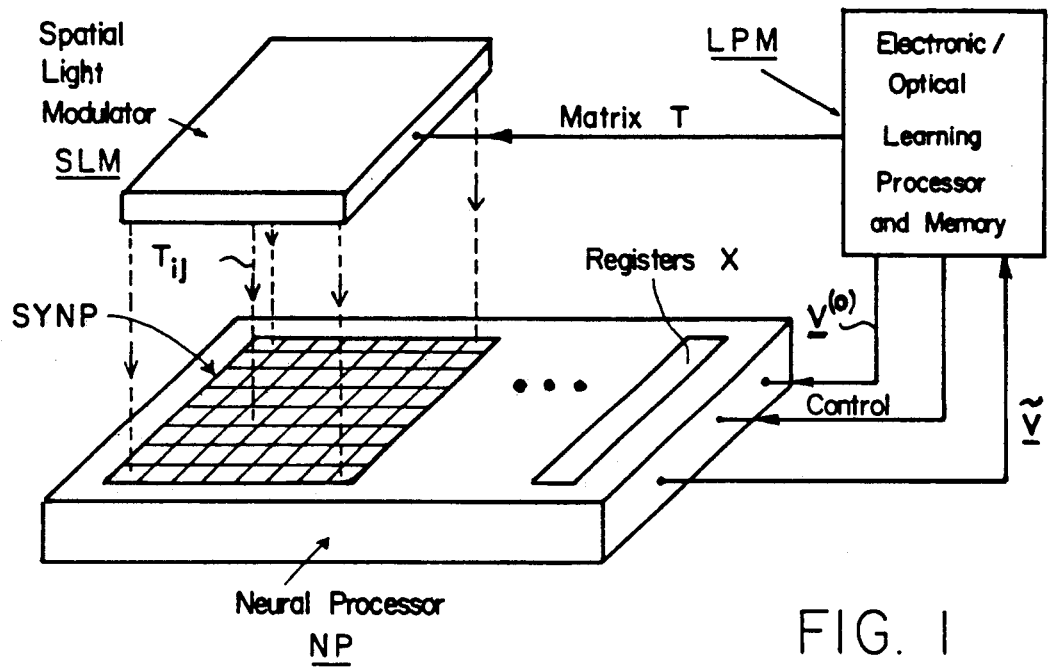
FIG. 1 illustrates the basic architecture of the present invention comprising three main subassemblies: a 2D spatial light modulator; a learning processor and memory; and an integrated circuit referred to as the neural processor.

Referring to FIG. 1, a new generic approach for realizing neural network (NN) models will now be described. The new approach is based on combining electronic signal processing of a neural processor NP on very large scale integrated (VLSI) circuit chip with a spatial light modulator SLM for parallel loading of a matrix T that defines the synapses of the NN. An example of a spatial light modulator is described by William E. Ross, Dimitri Psaltis and Robert H. Anderson in a paper titled "Two-dimensional magnetooptic spatial light modulator for signal processing," SPIE, Vol. 341, Real Time Signal Processing V(1982) pp. 191-198.

By imaging the contents of the spatial light modulator onto a light detector array LDA, which serves as an input unit of the neural processor NP, a matrix T can be loaded in parallel into the LDA. The neural processor then updates the vector state $\underline{V}$ of the neural network by computing the inputs $I_i$ in parallel, and using the decision process of Equation (2). Updating the vector state continues synchronously, or asynchronously, until stopped by the controlling systems.

In the first and second embodiments described below, the light detector array LDA of the neural processor NP is implemented with an array of N linear, CCD shift registers where each of the CCD shift registers has an equal number of binary digit (bit) stages into which the respective rows of the matrix T are loaded. The number of bit states may be equal to, greater than or less than the number of CCD shift registers, but for simplicity it is assumed the number of stages is equal to N for storing an N×N matrix T.

At each iteration of the neural processor NP, the successive columns of the matrix T are sequentially multiplied by each of the successive neurons in the state vector $\underline{V}$, first the initial vector $\underline{V}^{(0)}$, and then the updated vector $\underline{V}$ until convergence is reached. At each step of the process in multiplying the matrix T by the state vector $\underline{V}$, the sum of products is accumulated in a column of integrators ACCUM. Thus, the neuronic inputs $I_i$, are calculated in a semiparallel synchronous manner. In third and fourth embodiments, completely parallel architectures are disclosed for the neural processors NP to carry out the matrix multiplication process based on charge injection device (CID) technology and phototransistor technology, respectively.

The first embodiment of the present invention will now be described with reference to FIG. 2a in which:

(1) SYNP is a CCD matrix of N recirculating analog registers (the rightmost element feeding the left-most element of the register of each row) each register preferably divided into N elements, although it is not necessary that the matrix T be square (N×N). See A. Dembo and O Zeitouni, "General Potential Surfaces and Neural Networks," Phys. Rev. A 37(6) p. 2134 (1988).

(2) MUL is a column of N multipliers, each having a multiplier signal port, and multiplicand input and product output ports. A single-bit multiplier from the column MUL is shown in FIG. 2b as a multiplicand (i) pass gate, which is an analog switch controlled by a binary multiplier $V_i$.

(3) ACCUM is a column of N accumulating registers. Each accumulates the successive product signals which are fed into it from the respective one of the multipliers MUL.

(4) F is a column of N decision functions of the type described in Equation (3) for this example of a Hopfield model. Each unit of the column F produces as an output the next state, $V_i$, as a response to an input $I_i$.

(5) X is a CCD shift register of N stages having parallel input terminals connected to the decision functions, an input terminal for storing an initial state vector $\underline{V}^{(o)}$, and an output terminal for providing multipliers successive neuron values to the column MUL, and for reading out state vectors $\underline{V}$, where each stage can receive for storage an input $I_i$ directly from the respective decision function, and the contents of the stages can be shifted out sequentially as multipliers through the first stage shown at the top.

The architecture of FIG. 2a includes a control unit CU required to drive the system. This control unit accepts the data to be memorized and, with the operations of a programmed microprocessor μP, calculates the synaptic interaction matrix T, defined by applying, for example, the learning rule given by Equation (6). Once defined, the matrix T is loaded into the synaptic interconnection matrix SYNP by the control unit CU, i.e., is loaded into the N rows of N dimensional CCD registers. While a dedicated computer may be provided off line or in the control unit CU for this task of defining the matrix T, it is more common to use the programmed microprocessor during an initial period.

Although electronic loading of the matrix T is indicated in FIG. 2a, optical loading is also possible since CCD registers used to store the matrix T will accept and store light from an array of pixels the intensities of which are controlled by a spatial light modulator according to the $T_{ij}$ values of the matrix in accordance with the arrangement of FIG. 1. Once loaded, the matrix T is readily processed electronically in accordance with the first embodiment of the invention. It should be noted that for either electronic or optical loading, the matrix T could be defined off line using any suitable means, including pencil and paper, and any known learning rule, a preferred one having been given by Equation (6). Once the matrix is thus defined by any method selected, it may be readily entered.

The control unit CU supplies the various control signals necessary to control the system components. In this example of the first embodiment, it also loads the matrix T and an initial state vector $\underline{V}^{(o)}$ into the CCD matrix SYNP and shift register X, respectively, either optically or electronically. In either case, the elements of the neural processor may be implemented with VLSI circuit technologies. The control unit CU accepts the output vectors $\underline{V}$ and transfers them out via the programmed microprocessor μP. The control unit CU is governed by the programmed microprocessor μP for its input/output sequence and timing.

Prior to the operation of the neural processor NP, the synaptic interaction matrix T is loaded into the SYNP, and the initial state vector $\underline{V}^{(o)}$ is loaded into the register X. The first operation cycle of the device is described in the Table of FIG. 4.

(1) After RESET the common enable (multiplier) signal $V_1^{(o)}$ to the column MUL of binary multipliers is supplied by the upper stage of the register X, and the data inputs to the multipliers MUL are supplied by the rightmost column of the matrix SYNP, i.e., $T_{i1}$, i = 1 ... N. The accumulation registers ACCUM are set initially to zero by a RESET signal from the control unit CU.

(2) After the first clock pulse, the outputs of the multipliers MUL, namely $T_{i1}V_1^{(o)}$, i = 1 ... N, are accumulated in the respective accumulation registers ACCUM. The multiplier (neuron) signal fed back to the multipliers is now $V_2^{(o)}$, and the respective inputs into the multipliers MUL are $T_{i2}$, i = 1 ... N.

(3) The next terms $T_{ij}V_j$, j = 2,3 ... N are then sequentially accumulated in the respective accumulation registers ACCUM until after the N'th clock pulse, at which time they contain the sum $$I_i = \sum_{k=1}^{n} T_{ij}V_j \quad i = 1 \ldots N.$$

In that manner, each neuron of the state vector in the register multipliers the entire matrix T, and the products are accumulated to update each neuron in sequence.

(4) The (N+1)'th clock pulse activates the column of decision function units F, which produces a new state vector $\underline{V}^{(1)}$ of the system.

(5) The new state vector $\underline{V}^{(1)}$ is entered into register X by the next RESET, and the entire update cycle is repeated.

The system thus continues to update the state vector in the register X until a stable state is reached, at which time the last updated state vector $\underline{V}$ is the vector stored in the matrix T that is most similar to the initial vector $\underline{V}^{(0)}$. The microprocessor is programmed to continually read the updated vector $\underline{V}$ from the register X after each complete cycle, and to compare it with the vector read after the previous update cycle to determine when the updated vector $\underline{V}$ has become stable.

The operating speed of the device can be characterized by τ, the cycle time required for the complete network to be updated (i.e., the time it takes for the network to transform from state $\underline{V}^{(i)}$ to state $\underline{V}^{(i+1)}$). A consideration of the Table in FIG. 4 reveals that a complete update requires (N+2) clock pulses. Therefore τ is given by $$\tau = (N+2)/f_0, \quad (7)$$

where $f_0$ is the clock frequency of the system, and not of the microprocessor.

The present state of the art of the CCD technology is limited to devices with approximately $10^6$ elements (N = $10^3$), and a clock frequency of $f_0$ = 10 MHz. For such a device τ equals $10^{-4}$ sec. Thus, very fast updating is achieved (typically $10^4$ updates/sec for N = 1000), while the synaptic matrix interconnection problem is avoided. Further advantages stem from the fact that the synaptic interaction matrix can be optically loaded into the device using a spatial light modulator, thus enabling in-situ learning, i.e., defining and then storing the matrix T in the SYNP.

The speed of operation and simplicity of structure in the first embodiments of FIG. 2a render the system very attractive for implementing the basic Hopfield neural network model. It should be borne in mind, however, that using the same underlying principles, more sophisticated models can be implemented, shown in FIG. 3.

Figure 3:
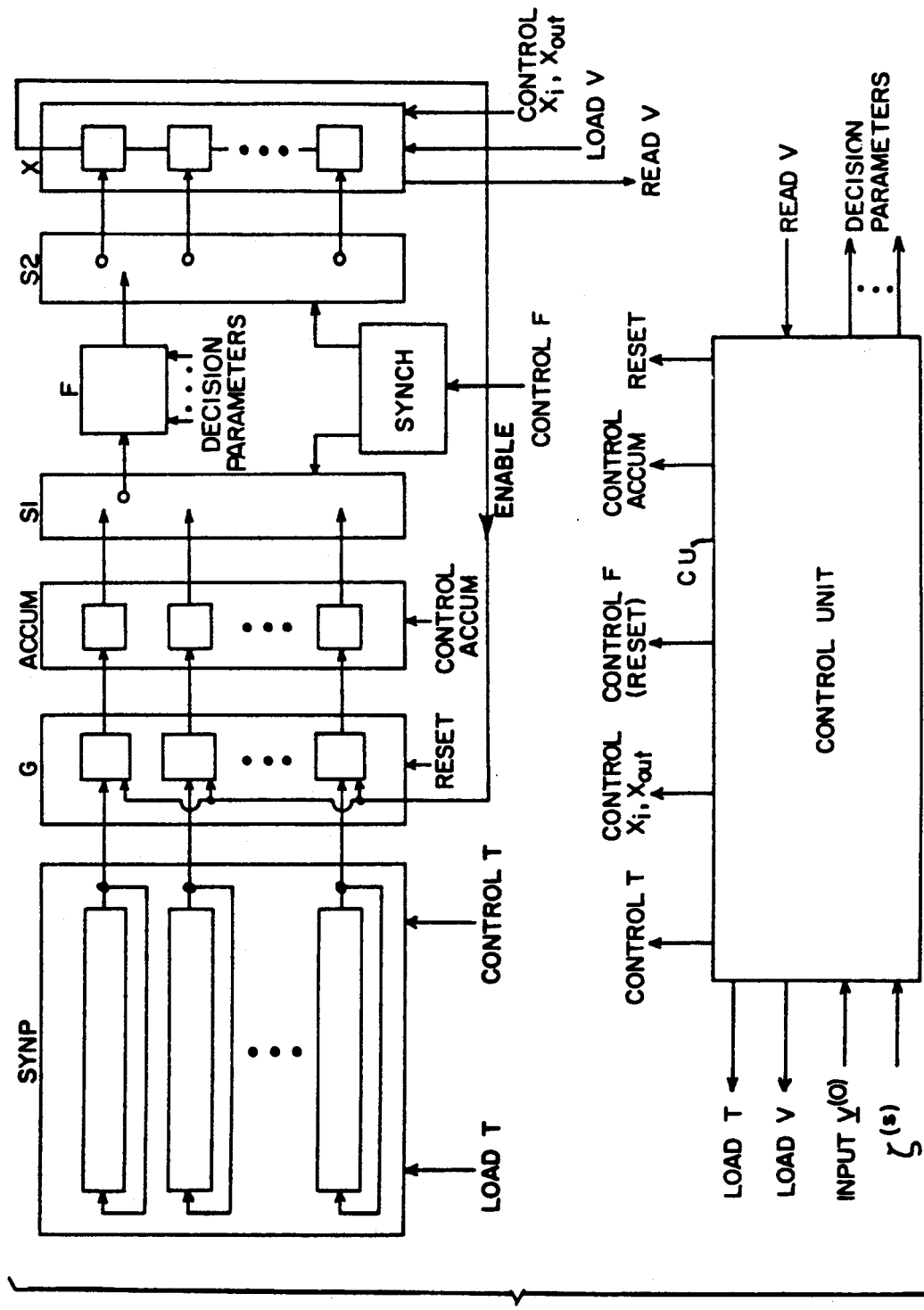
FIG. 3 illustrates the architecture for an advanced version of the neural processor of FIG. 2a comprising the elements SYNP, MUL, ACCUM X and a single decision function F which updates only one neuron at a time by utilizing a multiplexer MUX for the updating of each stage of the register X corresponding to each of the accumulators 1 through N.
Figure 5:
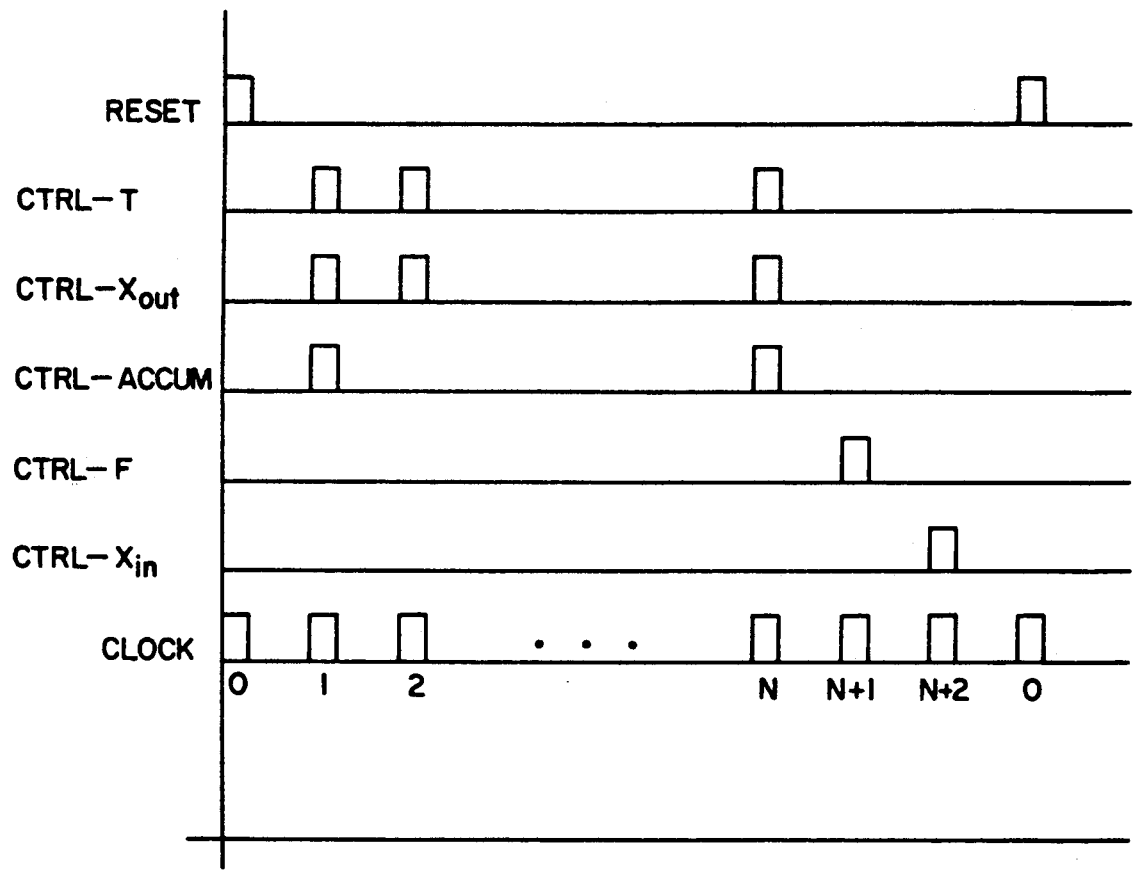
FIG. 5 is a timing diagram for the table of FIG. 4.

Comparing the second embodiment of FIG. 3 with the first embodiment of FIG. 2a, it can be seen that the systems are architecturally the same except for the decision function F which is time shared with all of the accumulators using a multiplexer comprised of switches S1 and S2, and synchronized switching means SYNCH operated by the control unit. Considering the Table in FIG. 4, which shows one cycle of operation for a complete update, it can be seen that the decision function F is inactive during most of the cycle while $\Sigma T_{ij}V_j$ is accumulated by the ACCUM. The timing diagram of FIG. 5 will facilitate understanding the system operation in accordance with the table of FIG. 4. This makes it possible to replace the column of multiple decision functions F with one complex decision function. The advantage of time sharing the decision function F is that the decision function may then be complex, such as a stochastic decision function, without unduly increasing the cost of the system. As noted hereinbefore, a stochastic decision function may be quite complex, more so than the threshold decision function of Equation (3). The added cost of the multiplexer is more than offset by the cost saving of providing only one complex decision function.

It should be noted that the $T_{ij}$'s of the synaptic interaction matrix T need not always be computed and loaded into the neural network in advance, i.e., prior to its operation. One of the interesting features of neural network models implemented in accordance with this invention is the ability to perform independent learning, i.e., to cause the $T_{ij}$'s to be modified according to the reaction of the neural networks to some teaching rules or patterns at any point during operation, as is done for example when an "error back propagation" learning method is applied via the programmed microprocessor and control unit of the learning processor and memory LPM. That is a feature of the first two embodiments as well as the third and fourth embodiments which will now be described with reference to FIGS. 6 and 8.

In both of these two additional embodiments, the neural network models are based on combining electronic signal processing circuitry of the neural processor NP produced on a VLSI circuit chip with a spatial light modulator SLM that provides parallel memory storage and loading of the synaptic interaction matrix T into the N×N matrix SYNP of analog memory cells, and with direct updating of the neurons in the register X on the VLSI circuit chip. The learning processor and memory LPM provides for initially defining the matrix T and entering it through the spatial light modulator SLM, and for the necessary control of the neural processor NP, as shown in FIG. 1. The learning processor and memory LPM may thus include the programmed microprocessor μP and control unit CU of the first two embodiments, as shown in FIG. 2a and FIG. 3.

Figure 6:
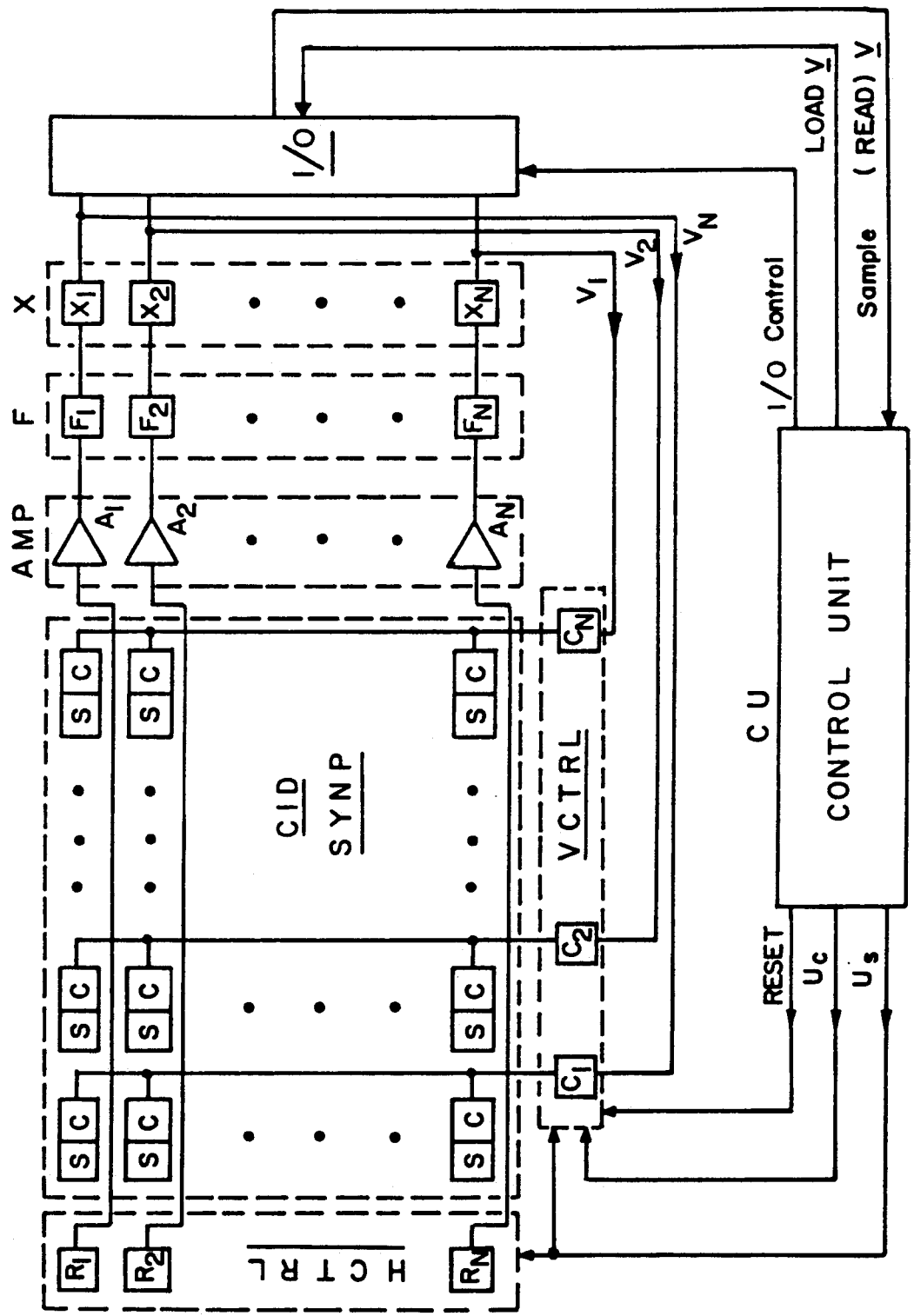
FIG. 6 illustrates an embodiment of the present invention utilizing a CID array for entering a matrix T in parallel from a 2D spatial modulator in accordance with the basic arrangement shown in FIG. 1.
Figure 7:
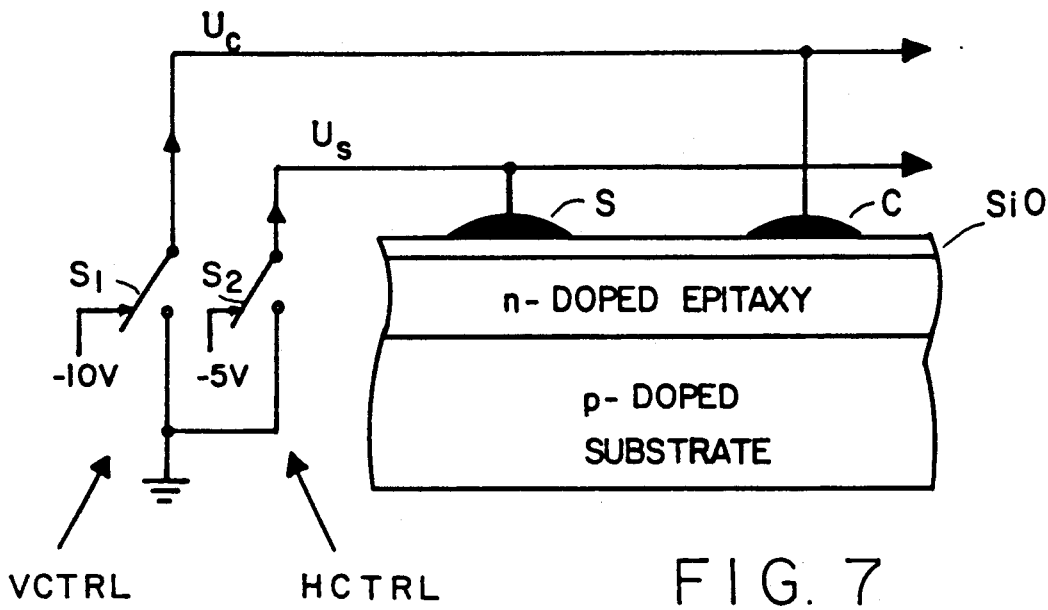
FIG. 7 illustrates a single cell of a synaptic interconnection matrix SYNP in the third embodiment shown in FIG. 6 which utilizes the CID device.

In the third embodiment shown in FIG. 6, the matrix T is entered in parallel in the form of light intensity pattern from the 2D spatial light modulator SLM shown in FIG. 1 incident on an array of charge injection devices (CID's) that store initial $T_{ij}$'s of the interaction matrix T. The SYNP is thus a solid state array detector with random access to each CID (sometimes referred to herein as each pixel or CID pixel) represented in FIG. 6 by a pair of coupled blocks labeled C and S that represent the areas under a charge collecting electrode C and a sensing electrode S, respectively, as shown in FIG. 7. Once the matrix T is entered, the spatial light modulator is turned off. This is somewhat similar to the first two embodiments that use CCD technology in that the CID SYNP has memory. In contrast, the SYNP in the last (fourth) embodiment shown in FIG. 8 which uses phototransistor technology does not have memory; consequently, the optical matrix T must be stored and continuously projected by the SLM.

The third embodiment will now be described in detail with reference to FIGS. 6 and 7. As just noted, it employs an array of CID pixels arranged in N rows and N columns, and two control units, one horizontal control unit HCTRL and one vertical control unit VCTRL. The horizontal control unit is represented by blocks $R_1$, $R_2$ ... $R_n$ and the vertical control unit by blocks $C_1$, $C_2$ ... $C_n$. The horizontal control blocks $R_1$, $R_2$ ... $R_n$ are connected to respective row conductors in the SYNP, which are in turn connected to respective inputs of a column of amplifiers $A_1$, $A_2$ ... $A_n$. The amplifiers are connected to a column of decision function units $F_1$, $F_2$ ... $F_n$ which are in turn connected to a column of binary state storage registers $X_1$, $X_2$ ... $X_n$, the outputs of which are connected to respective vertical control blocks $C_1$, $C_2$ ... $C_n$. The SYNP is thus a solid state CID array detector with access to each pixel by the control units VCTRL and HCTRL.

A detailed description of the principle of operation of the CID can be found in Michon, G. J. and Burke, H. K.: "Charge injection imaging," Digest IEEE International Solid State Circuit Conference (1973), Vol. 16, pp. 138–139. For an understanding of this neural processor application of the CID, it suffices to review only the basic operation of a single CID pixel with reference to FIG. 7 which shows a typical structure of a single CID pixel in a silicon chip having a p-doped silicon substrate (200μ) and an epitaxial layer (30μ) of n-doped silicon. A thin layer (~0.5μ) of $SiO_2$ is grown on the epitaxial layer, and the charge collecting and sensing electrodes C and S are deposited on about 30μ to 40μ centers. An array of parallel conductors deposited on the chip connect the charge collecting electrodes C in columns, and an array of parallel conductors, also deposited on the chip, connect the sensing electrodes S in rows. These vertical and horizontal conductors shown schematically in FIG. 6 are, of course, deposited with an insulating film between the two groups of parallel conductors. The charge collecting and sensing electrodes are normally biased at $-10$ V and $-5$ V through switches $S_1$ and $S_2$ in the respective control units VCTRL and HCTRL, but can be connected to circuit ground by the switches connected to the respective vertical (V) and horizontal (H) conductors.

The basic operation cycle can be broken into three major phases:

(a) Charge Accumulating

By properly biasing the charge collecting and sensing electrodes C and S at typically $V_C = -10$ V and $V_S = -5$ V, positive charge carriers excited by the absorption of photons in the substrate are accumulated beneath the charge collecting electrode.

(b) Sensing

By grounding the charge collecting electrode, the charge accumulated in the previous charge accumulating phase is transferred to the vicinity of the sensing electrode. The sensing electrode is precharged and then disconnected from the row amplifier ($R_i$) via switch $S_3$ prior to the transfer of charge. The transferred charge can be detected as $\Delta V_{out}$ by measuring potential changes on the latter.

(c) Resetting

Two types of reset are possible:
1. Destructive Reset. The sensing and charge collecting electrodes are grounded ($V_S = 0$, $V_C = 0$) which allows recombination to occur, thus eliminating the accumulated charge.
2. Nondestructive Reset. The electrodes are set to their initial bias voltage ($V_C = -10$ V, $V_S = -5$ V), and charge is transferred back to the charge accumulating electrode.

Architecture and Principle of Operation of the CID Neural Processor

For the sake of clarity, the CID NP to be described is a realization of the basic neural network model with binary neurons and analog synapses outlined above with reference to Equation (2).

In the schematic diagram of the neural processor presented in FIG. 6, sections analogous to those shown in FIG. 2a are identified by the same labels, and others with new labels, as follows:

SYNP is an N×N CID pixel array.
AMP is an N-dimensional column of high input impedance potential amplifiers, each capable of sensing the charge transfer into its respective row conductor.
F is a column of decision functions, e.g., threshold functions implementing Equation (3).
X is a column of binary registers which contain the state vector $\underline{V}$ of the system.

VCTRL is a row of N charge collecting control units to be described below.

HCTRL is a column of N sensing control units to be described below.

Both VCTRL and HCTRL are connected to a control unit CU as shown in FIG. 6. The control unit CU is contained in the learning processor and memory LPM shown in FIG. 1.

A complete update consists of the following phases:

(a) Initially the synaptic interaction matrix T, is projected onto SYNP so that the collecting electrode of each CID pixel accumulates charge proportional to the respective synaptic efficacy (i.e., the charge accumulated at the pixel i,j is proportional to $T_{ij}$).

(b) After charge accumulation is completed, a charge transfer phase takes place upon grounding the charge collecting electrode, i.e., setting $V_c=0$. For each column, if the respective neuron is active, i.e., if $V_j=1$, the accumulated charge is transferred from the charge electrode of each pixel of that column to the sense electrode under control of the respective VCTRL control blocks $C_1, C_2 \ldots C_N$ so that for the j'th column, $T_{ij}$ is transferred to the i'th row for $i=1 \ldots N$, that is to say from the charge electrode to the sense electrode of the i'th row.

(c) The charge transferred to the sense electrode of each pixel in a row is sensed collectively under control of the HCTRL blocks $R_1, R_2 \ldots R_N$; thus the charge measured at each row is proportional to $I_i$ (an analog signal) given by Equation (1), which is the sum of the products $T_{ij}V_j$, where $V_j$ (a binary signal) is provided by a register $X_j$ in the column of binary registers X through the control block $C_j$. The state of the vector $\overline{V}$ stored in the registers X is then updated using the output of the decision function column F.

(d) Finally the system is reset either destructively or nondestructively. In a destructive reset, the charge in each CID pixel of the SYNP is dumped into the substrate, and the CID pixel is ready for an optical reloading to restart the operating sequence with the first phase (a). In nondestructive reset, the charge under the sense electrode of each CID pixel is returned to the charge collecting electrode and the system is ready to reupdate the state vector $\overline{V}$ in the column of binary registers X starting with the second phase (b).

The update cycle thus described may thus be repeated until the state of the network converges, i.e., until the state of the vector $\overline{V}$ in the column of registers X becomes stable. The main control unit CU of the neural processor controls the update cycles, samples the vector $\overline{V}$ and determines when the vector $\overline{V}$ has become stable, as in the first two embodiments described with reference to FIG. 2a and FIG. 3.

Operation and Control of the CID NP

The CID NP shown in FIG. 6 is governed by an external microprocessor $\mu P$ through the control units HCTRL and VCTRL on the same VLSI circuit chip which contains the SYNP, AMP, F and X described above, and an input/output buffer I/O which receives from the microprocessor an initial state vector $\overline{V}^{(0)}$ for storage in the column of registers X, and receives an updated state vector $\overline{V}$ from the registers X for reading out to the microprocessor. The microprocessor generates five control signals: RESET, $U_c$, $U_s$, SAMPLE and I/O. The control signal I/O may consist of three binary signals coded as follows:

000—Standby
001—Transfer $\overline{V}$ to buffer I/O from $\mu P$
010—Transfer $\overline{V}$ to buffer I/O from X
101—Transfer $\overline{V}$ into X from buffer I/O
110—Transfer $\overline{V}$ to $\mu P$ from buffer I/O The code 001 thus enables the initial state vector to be read into the buffer I/O, and when the code is changed to 101, the initial state vector is transferred into the registers X, after which the code is changed to 000 by the microprocessor. Similarly, the code 101 enables the updated state vector to be transferred from the registers X to the buffer I/O, and when the code is changed to 110, the updated state vector is transferred from the buffer I/O out to the microprocessor.

It should be recognized that since the microprocessor controls the CID neural processor at all times, all transfers into and out of the registers X can be caused to take place only while the registers X are not being updated. Consequently, the buffer I/O may consist of simply logic gates that enable direction control of the transfer and the time of transfer. The column of binary registers X may thus serve as the input/output buffer register. A separate buffer register is shown and described simply to facilitate understanding control of this embodiment, which is quite simple since operation is parallel and synchronous. It is "parallel" because all neurons $V_i$ of the current state vector $\overline{V}$ multiply all of the synapses $T_{ij}$ at the same time to update the neurons (stages of the register X) in accordance with Equation (1), as compared to the embodiments of FIG. 2(a), and 2(b) which multiply each of the neurons $V_i$ in sequence with each column of synapses, one column at a time, thus requiring an accumulator to sum the products which adds to the complexity of the control system. And it is "synchronous" because each parallel update cycle must be timed in order that the updated vector $\overline{V}$ be checked for convergence. On some occasions, the microprocessor may determine that the updated state vector has converged after just two parallel updating cycles, but on other occasions many cycles may be required for convergence.

Implementation of the VCTRL and the HCTRL control of the CID pixel array for the SYNP may be best understood from the following description of FIG. 7. The switches $S_1$ and $S_2$ control the voltage of the vertical (column) and horizontal (row) conductors, respectively, of the CID array for the different phases of operation, as shown in the following table:

| Phase | $S_1$ | $S_2$ |
| --- | --- | --- |
| Accum. Charge | −10 V | −5 V |
| Sense | 0 V | −5 V (floating) |
| Reset (Destructive) | 0 V | 0 V |
| Reset (Nondest.) | −10 V | −5 V |

Figure 7A:
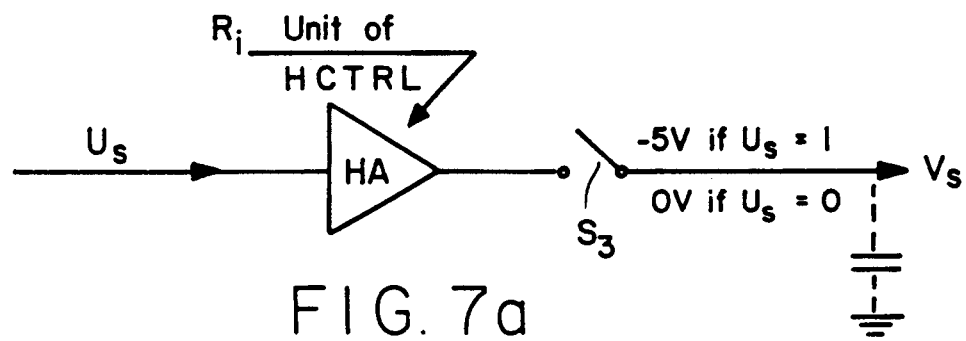
FIG. 7a illustrates the implementation of a "horizontal" control unit HCTRL, for the SYNP of FIG. 6

It is evident that the phase for nondestructive reset is simply a return to the initial phase of accumulating charge, but is set forth as a separate phase to emphasize this point. It is also evident that the control blocks $R_1$, $R_2 \ldots R_N$ for horizontal (row) conductors in the control HCTRL are always to be at −5 V, except during the destructive reset phase. Consequently, the control block $R_i$ (represented in FIG. 7 by a switch $S_2$) may be implemented by an inverting amplifier HA shown in FIG. 7a, which amplifier receives a CCD sense control signal $U_s=1$ from the microprocessor for the accumulating charge and sensing phases to produce a −5 V output on its respective horizontal (row) conductor.

During destructive reset, $U_s$ is set to zero to produce a 0 V output from the inverting amplifier HA.

Figure 7B:
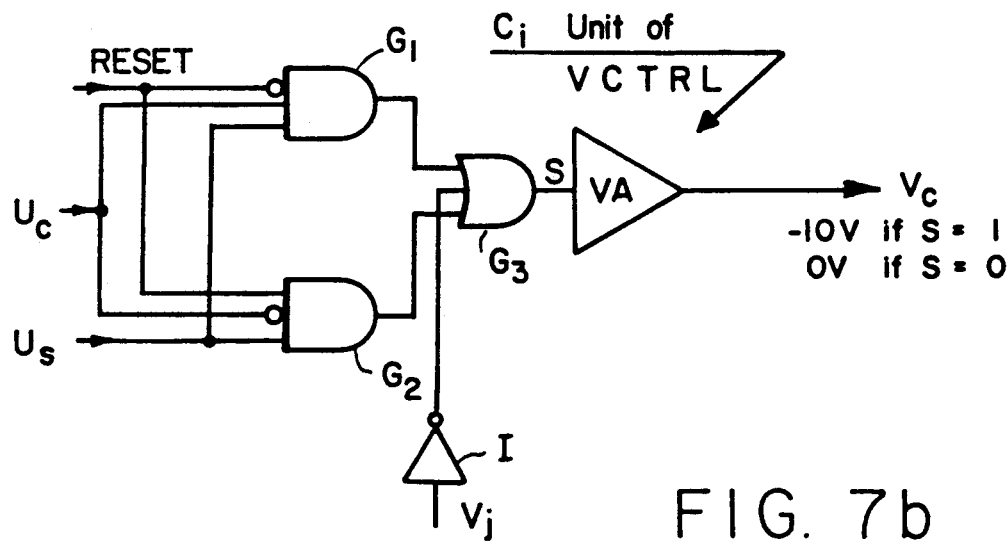
FIG. 7b illustrates the organization of a logic network for a "vertical" control unit VCTRL.

Each control block $C_1, C_2 \ldots C_N$ of the control unit VCTRL for the vertical (column) conductors (represented in FIG. 7 by a switch $S_1$) is only slightly more complex. The vertical conductors are to be $-10$ V only during the charge accumulation (or nondestructive reset) phase. An inverting amplifier VH shown in FIG. 7b for a control block $C_i$ produces a $-10$ V output to its respective vertical (column) conductor if its input is equal to binary 1, and 0 V output if its input if equal to binary 0. An AND gate $G_1$ is connected to receive control signals $\overline{RESET}$, $U_c$ and $U_s$ from the microprocessor, where $\overline{RESET}=1$ except during a destructive reset phase, and $U_c=1$, the charge collecting control signal, only during a charge accumulation (or nondestructive reset) phase; $U_c=0$ at all other times, namely during the reset and sense phases. Consequently, an AND gate $G_2$ is connected to receive the signals RESET, $\overline{U}_c$ and $U_s$. The outputs of the two AND gates $G_1$ and $G_2$ are connected to the input of a vertical control amplifier VA by an OR gate $G_3$. Thus, from this simple logic network, it is seen that the output $V_c$ of the control VCTRL is at $-10$ V when the following Boolean logic is true:

$$\overline{RESET} \cdot U_c \cdot U_s + RESET \cdot \overline{U}_c \cdot U_s$$

The control signal $U_s=1$ at all times, except during a destructive reset phase; it controls both $R_i$ and $C_i$ blocks to provide a 0 V output when $U_s=0$. Each vertical (column) conductor has an additional control, namely $V_j$ from the binary register $X_j$. If $V_j=0$, multiplication of $T_{ij}$ by $V_j$ in that column should produce a product equal to zero in Equation (1). That is best accomplished by the necessary control blocks $C_1, C_2 \ldots C_N$, and applying to each the signal $V_j$ through an inverter I to produce a signal $V_c=-10$ V when $V_j=0$; in other words to multiply a column by $V_j$, the value of $V_j$ must be equal to 1, which upon being inverted to 0 will cause the amplifier VA to produce a 0 V output, thus allowing the sensing phase to take place. If $V_j=0$, the inverter I will convert it to a 1, and the prevent sensing phase. In that manner, the control signal $V_c=-10$ V will prevent the charge collected at each pixel of the column from transferring to the sense electrode, thereby producing a product $V_j T_{ij}$ equal to zero.

Figure 8A:
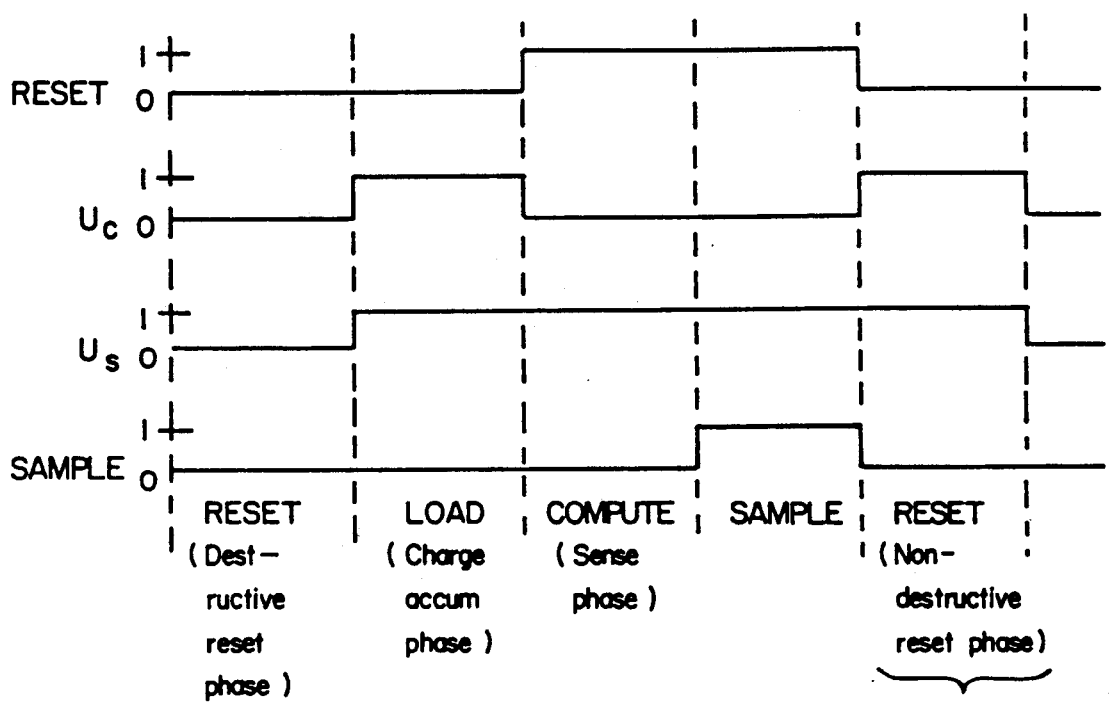
FIG. 8a is a timing diagram for the updating operation of the CID neural processor of FIG. 6 with parallel optical loading and nondestructive reset.
Figure 8B:
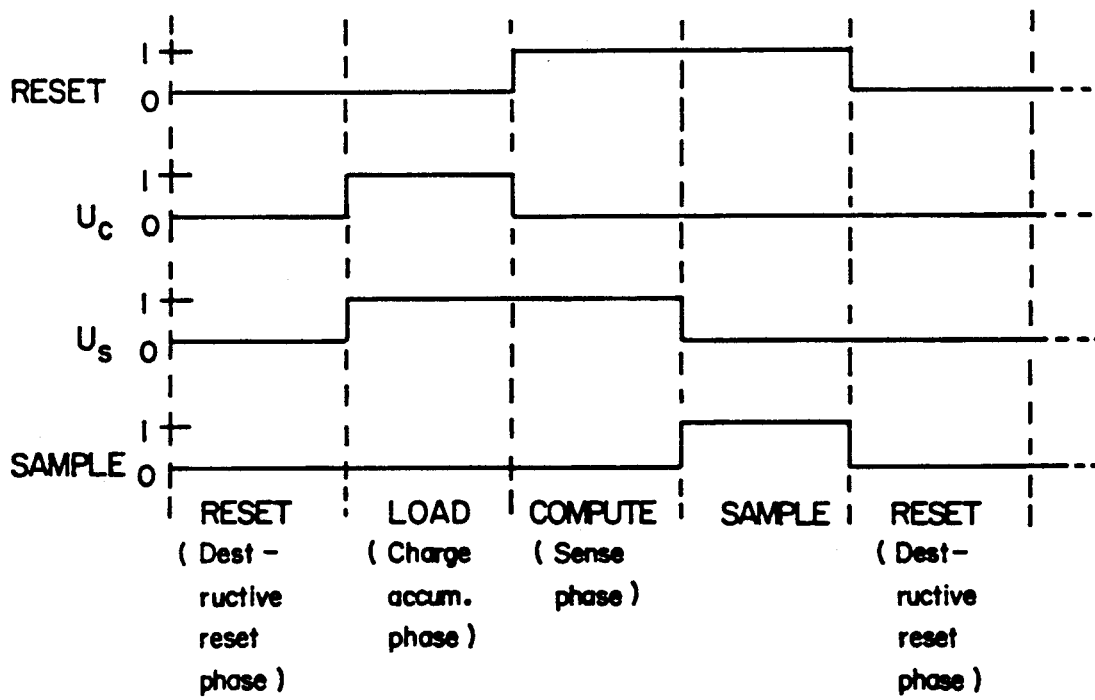
FIG. 8b is a timing diagram for the updating operation of the CID neural processor of FIG. 6 with parallel optical loading and destructive reset.

The microprocessor generates LOAD and SAMPLE control signals in addition to the RESET $U_c$ and $U_s$ control signals in order to control the timing of optical loading of a matrix T and sampling of state vectors in the registers X through the buffer I/O, which may be implemented simply as an input/output interface, as noted hereinbefore, thus controlling the timing of each state vector $\underline{V}$ sampled by the microprocessor to determine if the neural processor has reached convergence. FIG. 8a illustrates in a timing diagram a first iteration with optical loading and nondestructive reset. Subsequent iterations proceed to update until upon sampling it is found that the state vector $\underline{V}$ has stabilized, in which case a destructive reset is called for by setting RESET, $U_c$ and $U_s$ to zero. Thus, following each compute period for sensing and updating, there is a period for sampling the state vector $\underline{V}$ before nondestructively resetting and proceeding to compute (sense and update) during the next iteration. FIG. 8b illustrates a similar timing diagram for the mode of operation using destructive reset at the end of each update cycle. For each subsequent iteration, the matrix T is reloaded optically, and then the neural processor is reset before proceeding to the next compute and sample periods.

Currently existing CID pixel arrays typically contain $256 \times 256$ elements. The dimension of neural networks using this technology will therefore be limited until larger arrays of perhaps $10^3 \times 10^3$ become available when there is a demand for larger arrays. The same is true about the spatial light modulator technology.

The update rate will depend on the readout mode. When using destructive readout, T must be loaded prior to each update cycle. The update rate in this readout mode would be determined by the performance of the light source, and would be limited to a range of $10^3$ to $10^4$ updates per second. When using nondestructive readout, faster update rates can be achieved. Assuming 10 $\mu$sec/read, a rate of $10^5$ updates per second can be reached. However, in the latter case, noise from thermally generated charge has to be taken into account. Consequently, the neural processor NP will have to be kept at low temperature, or a periodic reset and reload of the matrix T must take place.

It should be noted that the neural process using the CID technology is not limited to the basic Hopfield model with binary neurons although that is the model contemplated in FIG. 6. Analog neurons may also be implemented by one additional control. In particular, by analog control of the bias voltage of the columns, the charge transfer efficiency can be governed, and thus analog neurons can be realized.

Figure 9:
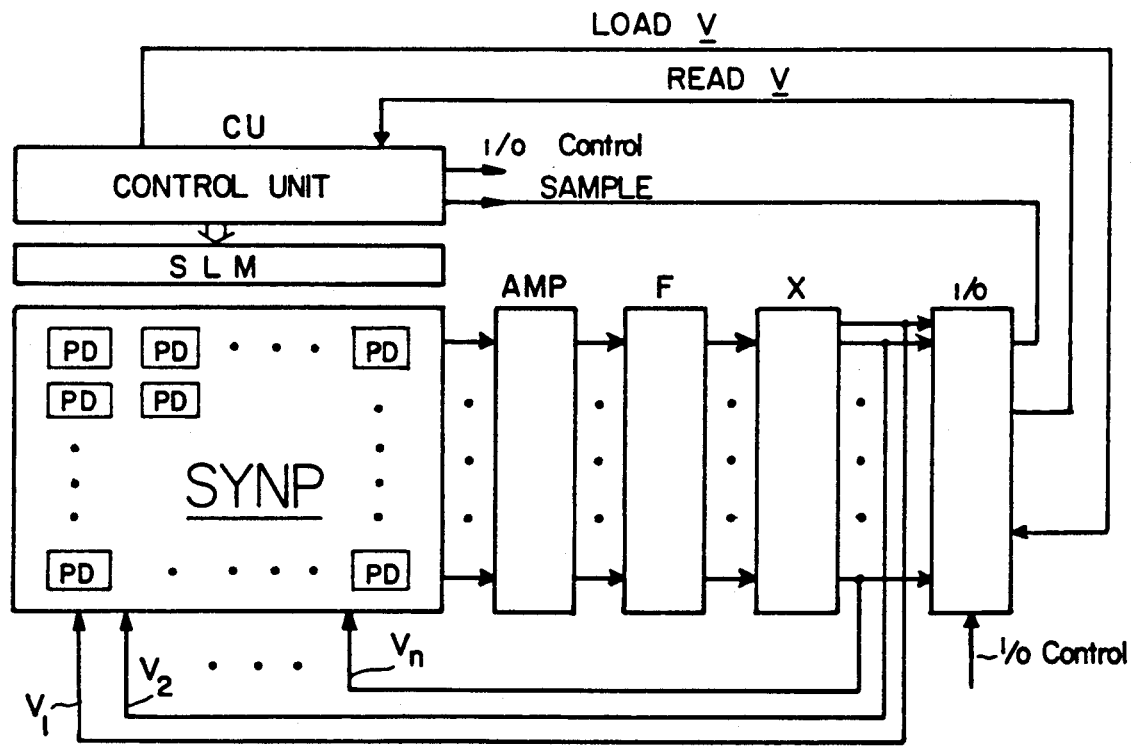
FIG. 9 illustrates a fourth embodiment of the present invention utilizing a phototransistor array for continuously entering a matrix T in parallel from a 2D spatial modulator and continuous synchronous updating of a state vector in a register X.
Figure 9A:
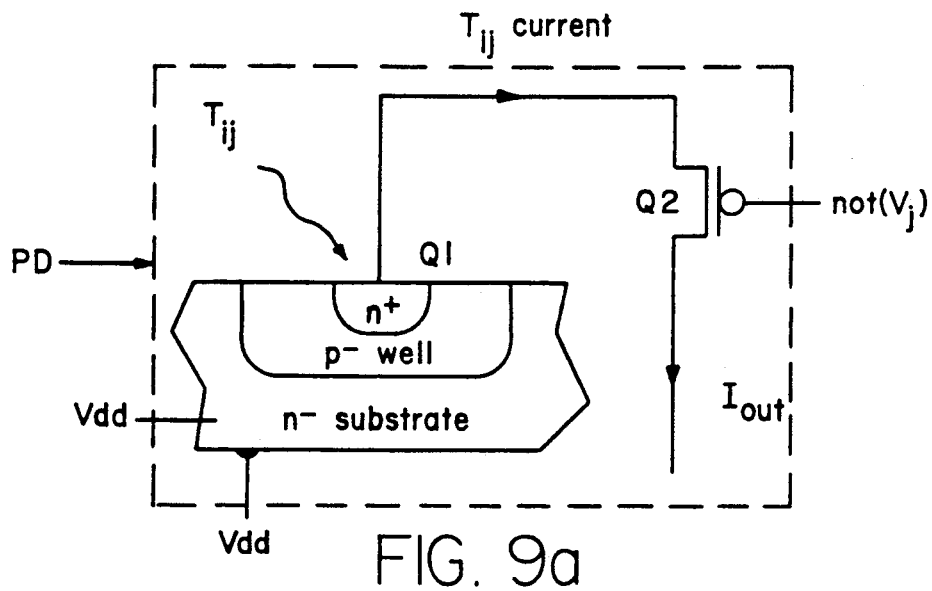
FIG. 9a illustrates a preferred implementation of a photodetector, PD, in the SYNP of FIG. 9 with a phototransistor for receiving an interaction connection value $T_{ij}$, and a p-channel FET switch which receives a binary neuron signal $V_j$ from the state vector for carrying out the multiplication $T_{ij}V_j$.

Referring now to FIG. 9, the fourth embodiment of the present invention is very similar to the third embodiment illustrated in FIG. 6, except that in place of a CID array for entering the synapse connection weight matrix T, there is instead an array of photodetectors represented by blocks labeled PD to make up the SYNP. Each photodetector is preferably implemented as shown in FIG. 9a with a phototransistor $Q_1$ connected in series with a p-channel FET switch $Q_2$. The SYNP thus implemented may be readily fabricated on a VLSI circuit chip containing the AMP, F and X sections of the neural processor NP shown in FIG. 6.

Once a matrix T is entered as a light pattern incident on the photodetectors PD of the SYNP, the matrix T is multiplied in parallel by the vector $\underline{V}$. Thus, each binary signal $V_j$ of the vector $\underline{V}$ is applied to the gate of a FET transistor $Q_2$ from a stage of the register $X_j$. In that way, the product of the matrix T and the neuron state vector $\underline{V}$ is formed in accordance with Equation (1) in a manner very similar to the third embodiment. The basic difference is that the SYNP implemented with photodetectors has no memory of its own and must therefore rely upon the LPM and SLM (FIG. 1) for memory. An advantage of this is that the matrix T in the SYNP is capable of being modified through the SLM after any updating cycle in order to realize an optoelectronic neural network model with programmable analog synapses. The flexibility of programming the learning processor and memory LPM allows for implementing graded response neurons.

As in previous embodiments, the synaptic iteration matrix T entered by imaging it onto an array detector SYNP serves as the input of the neural processor which updates the state of the vector stored in the registers X by computing the inputs $I_i$ to the column of amplifiers AMP, and using the decision process of Equation (3) for the decision function F. Thus, the photodetectors PD generate the current $I_i$ as the product $T_{ij} V_j$. The currents from all the PD's of the same row are summed in one horizontal conductor. Therefore, the currents into the column of amplifiers AMP is given by Equation (1). This current is now used to compute the level of the respective neuron, i.e., $V_i$ for the i'th row given by Equation (2). In that manner, a graded level neural network is realized and is updated in a continuous manner, which may be synchronous using a programmed microprocessor and control unit, or asynchronous, in which case a simplified control unit may be provided in the learning processor and memory LPM. In either case, the synaptic connection weights $T_{ij}$ can be modified independently of the neural processor NP by modifying the SLM through the LPM (FIG. 1).

Figure 9B:
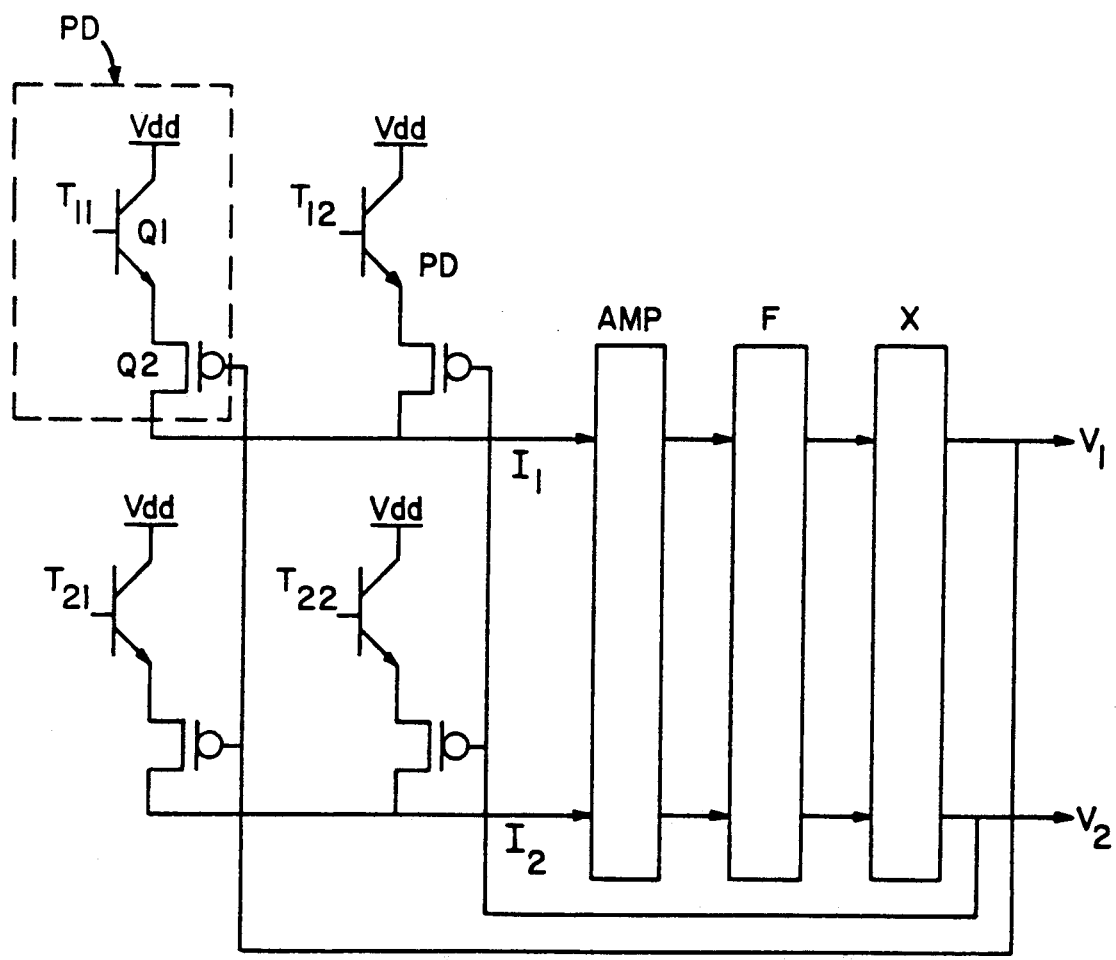
FIG. 9b illustrates a plurality of PC's having their FET switch connected in columns for parallel multiplication of respective columns of synapses $T_{ij}$, and connected in rows to sum current products, $I_i$.

The values $T_{ij}$ of the matrix T entered through the SYNP of FIG. 9 may be a continuous variable, i.e., may take on any value between zero and some practical limit. As in other embodiments, the values $V_j$ may also be a continuous variable, i.e., may also be analog, but for simplicity the special case of binary values has been used for illustration. In that case, if $V_j = 1$, the switch $Q_2$ is closed and a current $I_{out}$ proportional to $T_{ij}$ flows to amplifier $A_i$. If $V_j = 0$, the switch $Q_2$ is open, and the product $I_i = V_j T_{ij}$ is zero. The photodetectors PD in the SYNP are connected with the current outputs in the same columns connected together, and the inputs $V_i$ in the same rows connected together to sum currents in the columns of photodetectors as shown in FIG. 9b for a 2×2 section of a matrix.

As in the first three example, a microprocessor $\mu$P specifies the initial state vector $V^{(0)}$ loaded into the registers X, and reads out the final state vector $V^{(f)}$ after the neural processor stabilizes. A major difference is that this fourth embodiment may be used as a parallel asynchronous neural processor with its continuous current feature. The system can be used as a continuous matrix multiplier, and with an extension of the photodetectors to accommodate both positive and negative values for $T_{ij}$ and $V_i$, the system can be used for fully continuous matrix multiplication.

The various embodiments of the present invention can serve as a convenient and flexible tool for the purpose of investigating possible applications of neural-networks models. The fact that it is based on known microelectronic (VLSI) circuit technology gives it a high degree of reliability. Its main disadvantage lies in the fact that it is limited in dimension to the currently available spatial light modulators. However, it should be borne in mind that other technologies may be used to create the matrix T, such as a cathode ray tube on the face of which a dot matrix is created, with each dot having an intensity that is continuously variable, and optics, possibly a dot matrix mask to focus the matrix T onto pixels of the SYNP. Such a means for optically entering and varying the matrix T in parallel is well within the present state of the art.

Although particular embodiments of the invention have been described and illustrated herein, it is recognized that the modifications and equivalents may readily occur to those skilled in this art. Consequently, it is intended that the claims be interpreted to cover such modifications and equivalents.

We claim:

1. An optoelectronic neural network of N neurons connected to each other by synapses, in which the state of said neurons is given by a vector $V = V_1, V_2, \ldots V_j \ldots V_N$, where $V_j$ is the state of the j'th neuron, and the strength of the synaptic interaction between the neurons is defined by a matrix T, where $T_{ij}$ is a value representing the strength of the interaction between neurons specified in the i'th row and j'th column of said matrix, said neural network being implemented by an electronic system comprising means for storing said interaction matrix T, comprising a spatial light modulator for producing a pattern of light intensity corresponding to spatial distribution of said values $T_{ij}$ of said matrix T, and an array of photodetectors spatially distributed to separately receive said values $T_{ij}$, means for storing said state vector $\underline{V}$, said vector storing means having a column of N registers, one for each vector element $V_j$ constituting a neuron, means for multiplying said matrix T with said state vector $\underline{V}$, and means for summing the products of said multiplication for each row of said matrix to produce a current $$I_i = \sum_j T_{ij} V_j,$$

where $I_i$ is the current for the i'th row of said matrix corresponding to the j'th neuron of said state vector, means responsive to said current sums $I_i$, for producing new values $V_j$ for said state vector in accordance with predetermined decision parameters, and means for storing said new values $V_j$ of said state vector in said column of N registers.

2. An optoelectronic neural network system as defined in claim 1 wherein said means for producing new values $V_j$ is comprised of a column of separate means for performing a decision function, one for each current sum, each means for performing a separate decision function coupling a predetermined value $V_j$ to the j'th one of said registers if the input from a corresponding i'th current sum is equal to or exceeds a predetermined threshold value.

3. An optoelectronic neural network system as defined in claim 1 wherein a single means for producing new values $T_{ij}$ is provided with multiplexing means for directing each of said current sums $I_i$ in sequence through said single means in sequence to produce said new values $V_j$ for the next state vector $\underline{V}$.

4. An optoelectronic neural network as defined in claim 1 wherein said array of photodetectors is comprised of an array of recirculating registers, and each register is comprised of a linear array of charge-coupled devices, each for sensing photons from said spatial light modulator and storing a charge proportional thereto, and means for shifting the accumulated charges from one column to the next, and from the last column to the first column, all in the same row, said means for storing said state vector $\underline{V}$ is comprised of registers includes means for shifting out in sequence the values $V_j$ of said state vector which represent neuron states in order to multiply said matrix T by each neuron state value $V_j$, said means for multiplying is comprised of a column of N multipliers each connected to receive as inputs in one multiplication cycle a separate one of a column of values $T_{1j}$ of the matrix T, where j = 1, 2 ... N designating said separate column of said matrix T, and repeating said multiplication cycle N times, one for each column of said matrix per neuron state value $V_j$ of said state vector, and said means for summing said products is comprised of a column of N accumulators connected to accumulate the sums of products $T_{ij}V_j$ for each row i of said matrix T.

5. An optoelectronic neural network as defined in claim 1 wherein each photodetector for said array is comprised of a charge injection device implemented in a semiconductor chip comprised of a first electrode for collecting photoelectrons in said semiconductor chip, a second electrode for sensing the charge stored, and switching means for selectively transferring stored charge from said collecting electrode to said sense electrode for reading out, for transferring stored charge from said sensing electrode back to said collecting electrode for storage, and for dumping all charge from said collecting electrode and said sensing electrode for clearing said matrix T from said array of photosensitive devices, and means for multiplying interaction connection values $T_{ij}$ of said matrix T stored in said charge injection device array by values $V_j$ of said state vector in parallel.

6. An optoelectronic neural network as defined in claim 1 wherein each photodetector of said array is comprised of a phototransistor for producing current proportional to intensity light received, and said means for multiplying said current produced by $V_j$ is comprised of separate means for multiplying said current produced by said phototransistor with a value $V_j$ of said state vector $V$, whereby upon summing the outputs of said multiplying means by row there is formed for each row of said matrix T a current.

7. An electronic neural network of N binary neurons connected to each other by synapses, in which the state of the system is given by a vector $\underline{V}=(V_1, V_2 \ldots V_i \ldots V_N)$, where $V_i$ is the state of the neuron i, and the strength of the interaction between the neurons is defined by a matrix T of rows and columns, where $T_{ij}$ is the strength of the interaction between neurons i and j, said neural network being implemented by an electronic system comprising an array of N recirculating registers to store said interaction matrix T, one recirculating register for each row of said matrix T, a recirculating vector register for storing a state vector $\underline{V}$ comprised of a column of stages, one stage for each state vector value $V_j$, a column of multipliers, one for each row 1 of said matrix T, each connected to receive in one cycle as inputs interaction connection values $T_{ij}$ of said matrix T, where $j=1, 2 \ldots N$, and a state vector element value $V_j$ from said vector register, where $i=1, 2 \ldots N$ in sequence, with the sequence repeated, one for each vector value $V_j$ for one complete multiplication of said matrix T by said vector $\underline{V}$, to produce for each state vector value $V_j$ a product $T_{ij}V_j$, a column of accumulators, each connected to accumulate the sums of said products of said multipliers for each row of said matrix T in accordance with the equation $$I_i = \sum_j T_{ij}V_j,$$

and means for producing, in response to said sums in said accumulators, outputs $V_1, V_2 \ldots V_j$ as new state vector values of the next state of said vector stored in said recirculating register in accordance with predetermined decision parameters.

8. An electronic neural network system as defined in claim 7 wherein said means for producing said new state vector values is comprised of a column of separate means, one means for each accumulator, functioning in accordance with predetermined decision parameters, each separate means coupling a predetermined state vector value $V_j$ to the j'th stage of said recirculating state vector register if the input from a corresponding accumulator satisfies said decision parameters, control means for advancing said matrix T in said array of recirculating registers in a row direction one column for each multiplication for a state vector value $V_j$, and for advancing said state vector stored in said recirculating state vector register one stage for multiplication of said matrix T by each vector state value $V_j$ in sequence while accumulating said products $T_{ij}V_j$ in said column of accumulators for the complete multiplication of said matrix T by said state vector V, and means responsive to said separate decision function means for updating said state vector recirculating register after all the present state vector values $V_j$ have been shifted out for multiplication of said matrix T.

9. An electronic neural network system as defined in claim 7 wherein a single decision function means is provided with multiplexing means for use with each accumulator to produce a new state vector value $V_j$ of the next state of said vector stored in said recirculating register once the present state vector has been shifted out for multiplication of said matrix T.

10. An electronic neural network as defined in claim 7 wherein said array of recirculating registers is comprised of an array of CCD photodetectors arranged in recirculation rows, whereby said matrix T may be initially stored in parallel by means for illumination of said CCD with a predetermined matrix pattern of light.

* * * * *